June 11, 1940.
G. W. HAMMACK
2,203,959
PNEUMATIC SEPARATOR
Filed Jan. 19, 1938
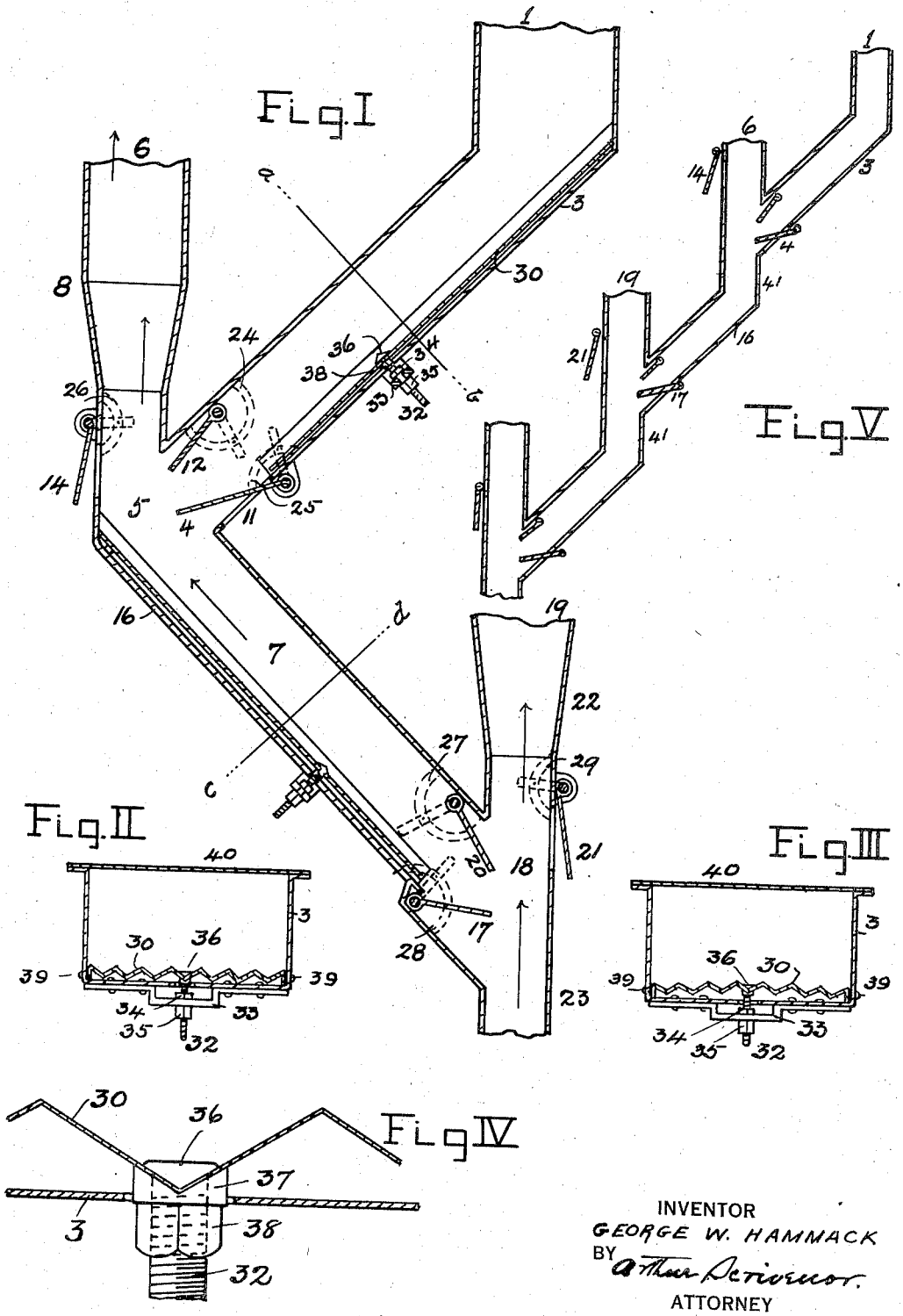
INVENTOR
GEORGE W. HAMMACK
BY
ATTORNEY Patented June 11, 1940

2,203,959

UNITED STATES PATENT OFFICE 2,203,959

PNEUMATIC SEPARATOR

George W. Hammack, Richmond, Va.

Application January 19, 1938, Serial No. 185,637

9 Claims. (Cl. 209—133)

My invention relates to improvements in pneumatic separators; more particularly to those separators in which the force of gravity, and a current of air, adjusted as to its strength for the material to be treated, and especially for the separation of dust, waste, and stems from tobacco leaves, are the principal forces relied upon to handle the material to be separated.

In separators of this type it is important that the air current shall be adjustable in volume, force, and direction; and it is also important with some classes of material which are to be cleaned that the operation shall be divided into stages, so that the lighter material may be separated at one stage, while heavier material is allowed to pass on for separation at later stages. By this means a greater percentage of good leaf is recovered. The object of my invention is to produce an inexpensive separator in which the separating may be divided into stages, and in each of which stages the action of gravity upon the material, and the volume and strength and direction of the air currents may be adjusted and controlled.

It is also an object of my invention to produce an apparatus in which the movement of the material when under the influence of gravity shall be guided and suitably spread so that it may present to the separating air currents a mass of uniform thickness and of as great area as possible, so that the action of the air current upon the mass may be as uniform as possible at all points.

In the accompanying drawing: Figure I shows a two-stage separator in vertical section; Figure II shows a cross section of the chutes on lines a—b and c—d in Figure I. Figure III shows the same cross section of the chutes, but with the bottom of the chute raised about its central line. Figure IV is an enlarged detail showing a method of connecting the bottom adjusting bolt with the bottom itself. Figure V shows another arrangement of the stages in my separator.

The material to be cleaned by separation is introduced at the opening 1, either by hand or by conveyor. The material falls upon the inclined bottom of the chute 3; slides down the chute onto the adjustable lip 4 from the end of which it shoots off into the up-current of air at 5, which current of air is induced by exhausting means connected to the outlet 6. The air moves in the directions indicated by the arrows.

The lip 4 is hinged outside and underneath the chute 3, and passes through an opening 11 in the bottom of the chute 3. When the lip 4 is raised to a more or less horizontal position, as shown at 4, air is free to enter at the opening 11, (being drawn in by the suction at 6,) and to flow along the under side of the lip 4. The change in inclination between the bottom of the chute 3 and the lip 4 causes the material to shoot off the end of the lip 4 and into and across the air current, rather than drop into the second leg 7 of the separator before it can feel the full and uniform effect of the upwardly flowing current of air. The projecting of the material from the end of the lip 4 into the upwardly flowing air current is helped by the current of air entering the separator by the opening 11 and flowing along the under side of the lip 4. This air current flows in a thin sheet with considerable velocity; and it supports the light material as it slides off the lip 4. This inflow of air at 11 is assisted by a current flowing up the leg 7. Air allowed to come in from the chute 3 robs the air pull at air-port 11 and up leg 7 since it partly satisfies the pull at 6, and it has little if any use as a lifting current. Therefore to get the best effect at 11 and 7 with a constant pull at 6, I swing damper 12 down toward the lip 4 to cut off as much air inflow as possible without catching and holding back the tobacco material. I adjust lip 4 to a suitable angle for projecting the tobacco material into the air currents rising at 5; and if the current entering at 11 and up leg 7 is too strong, the air door 14 is opened an amount sufficient to counteract the excess draft at 6. It is important that the tobacco material be not whisked up by the exhaust at 6 directly off lip 4; for more than light material would then be lifted. It is important that the tobacco material be allowed to slide easily off lip 4 into space 5, where it will be momentarily supported and tossed by the air currents coming in at 11 and up at 7. The lighter material will be caught in them and lifted; and the heavier material, some of it held for a moment, will be dropped. This has been observed. To achieve this result I find it best to use a constant air velocity in the exhaust main above 6 and 19. This velocity is about 3500 feet per minute for light grades of leaf; which is a velocity sufficient to keep the leaf moving, but not so great as to whip the leaf about and tear it. In the separator at 5 I use a lower velocity; the openings at 11 and 7 being larger; and this lower velocity I adjust by means of the air door 14. This air door, 14, is most desirable in separators having more than one stage, and in which each of the stages, or more than one of the stages, is connected to one and the same exhauster, and where a different air velocity is required at the several exhaust outlets. This is true of the air door 21, for the air velocity upward at 18 must be greater than the air velocity upward at 5, because of the heavier material to be lifted. Also, by a proper adjustment of air door 21, and air-damper 20, we can split the up draft, part of it going up 18 and part of it going up 7. The rate of flow of the material down the chute 3 is controlled by the choke-damper 12; which is raised or lowered to increase or to decrease the flow.

Sliding off the end of the lip 4 into the air stream at 5, the heavier material not lifted by the air current will drop onto the inclined bottom 16 of the second leg 7 of the separator, and it will slide down this leg and onto the second adjustable lip 17, from the end of which it is projected into an upward flowing air current at 18, induced by exhaust means at the outlet 19. At 20 is an air-damper for regulating the velocity of the air current flowing up the leg 7. At 21 is an air door for regulating the effect of the exhaust at 19 on the air velocity over the lip 17 and up the pipe 23 by admitting free air to the air-pipe 22. Heavy material not lifted by the air stream at 18 will fall down the leg 23.

There is no opening in the bottom of the second leg of the separator under the lip 17, as there is under the lip 4 in the first leg. It is not necessary. In the first leg any dust and the lightest scrap is carried up by the exhaust at 6; but it is desired to let heavier scrap pass on to other legs for separation and grading. Instead of regarding the leg of which the chute 7 is a part as the second leg of a series, regard it as the last leg of a series. All waste and light scrap has been taken out at the higher up stages; the very light at the highest, and the heavier at those lower down. At the last leg we have left only the heavy scrap and stems, and some scrap attached to stems. We here take out all of the good scrap left, on the up-flowing air stream, and allow the stems to fall down the leg 23. There is not the same necessity for the air-flow under the lip 17 as there is under the lip 4 because the load to be handled is less dense.

At 24, 25, 26, 27, 28, 29, are shown quadrants and arms for adjusting the plates, lips, or dampers to which they are respectively connected, and for indicating their positions.

I stress the importance of the adjustability of the inclination of the lips 4 and 17. In the case of tobacco, particularly, it is not sufficient to allow the tobacco merely to slide off the end of the chute into the air stream; for then it will tip its end into the stream, and the layer of material will be presented edgewise to the stream. It is best to project the layer of material into the stream as nearly as possible at right angles to that stream, so that the up-flowing air may have its greatest effect upon the surface presented to it.

It is desirable to bring the material to the lips 4 and 17 in an even and uniform spread or layer, so that the air passing through the layer when it leaves the end of the plate may have an equal effect upon all parts of its area. Material such as tobacco, when dropped in at the inlet 1 either by hand or by a conveyor, is apt to ball or collect in denser masses here and there, so that the spread on the bottom of the chute is not even. It may be thicker toward the center, or toward one side. Such an uneven spread, when projected from the end of lip 4 or lip 17 would not be presented to the air current in an even layer; and separation would be imperfectly done. Even when material is introduced carefully at inlet 1 in an even spread, it may in its passage down the chute collect more or less into uneven masses. To counteract this tendency to collect as it passes down the chute, I place in my chute a corrugated bottom 30, the corrugations preferably being of V form. I have shown the same corrugated bottom in both legs of the separator in Figure I. If the material is introduced in an even spread, the corrugations in the bottom will tend to keep the spread even as it passes down the chute. If for any reason the material tends to collect towards the center, or towards the side, of the chute, I counteract this tendency by raising or by lowering the center of the corrugated bottom slightly. This I do by raising or by lowering the adjusting screw 32, which is held in a strap 33, which is attached to the bottom of the chute. The center of the corrugated bottom can be adjusted as to height while the machine is in full operation. This is most important, because it may be necessary to adjust the crown of the bottom several times during a given period. It is not practicable to determine the proper adjustment before the material begins to flow down the chute. It can only be found by trial after the material is flowing. For these reasons it is important that the bottom be adjustable from the outside of the chute, while the machine is in operation. The two locknuts 34 and 35 hold the screw in any raised or lowered position. The screw 32 is attached to the corrugated plate by its head 36, the washer 37, and the nut 38. This adjusting screw I place approximately two thirds of the way down each of the chutes. In Figure II the corrugated bottom of the chute is shown approximately flat. In Figure III its center is shown raised a little. The edges of the bottom are secured to the sides of the chute by rivets, bolts, or screws 39. The upper side of the chute is closed by a removable plate 40, to afford access to the interior.

I also construct my separator in a straight-line series, as indicated in Figure V. The details of the separator here are the same as in Figure I. There is sometimes a choice between one form or the other, to fit into a factory space. In the straight-line series a drop-leg 41 is provided between chutes to keep the material in motion.

I claim:

1. In a pneumatic separator, the combination of an air-pipe carrying a stream of air; a material chute connecting with and delivering into the air-pipe; at the foot of the material chute an adjustable lip to set the angle at which the material shall enter the air-pipe; a check-damper in the air-pipe adjacent its connection with the material chute for admitting free air to the air-pipe; a flexible bottom-plate in the chute; and means outside the chute and connected with the flexible bottom-plate by which the height of the center portion of the bottom-plate may be adjusted.

2. In a pneumatic separator: the combination of an upwardly inclined air-pipe; a downwardly inclined material chute connecting with and delivering into the air pipe; a flexible corrugated bottom plate in the chute, the corrugations running parallel with the sides of the chute; and means outside the chute and connected with the flexible bottom plate for adjusting the height of the center portion of the bottom plate.

3. In a pneumatic separator and grader: a vertically positioned pipe having a material inlet on one side, a material outlet below the said inlet, and an air outlet above the said inlet; exhaust means connected with the said air outlet;

an inclined material chute connected by its lower end to the said material inlet in the pipe, the said chute having at its lower end an air-port, and also having an adjustable lip hinged at its lower end and over the air-port; an adjustable air-damper in the material inlet in the pipe to control the admission of air into the said pipe through the said inlet; and an adjustable air-door in the side wall of the pipe and slightly above the level of the material inlet, and adjustable to admit air to relieve the vacuum below the said air-damper.

4. In a pneumatic separator and grader: a vertically positioned pipe having a material inlet on one side, a material outlet below the said inlet, and an air outlet above the said inlet; an inclined material chute connected by its lower end to the said material inlet in the pipe, the said chute having at its lower end an air-port, and also having an adjustable lip hinged at its lower end and over the air-port; an air-door in the side of the pipe and slightly above the material inlet; and a flexible bottom in the chute, and adjusting means located outside the chute and connected with the flexible bottom and by means of which the flexible bottom may be given a flat or a curved surface.

5. In a pneumatic separator and grader: two or more vertically disposed pipes arranged in series, each pipe having a material inlet on one side, a material outlet below the said inlet, and an air outlet above the said inlet; exhaust means connected with the said air outlet; inclined material chutes connected each by its lower end to one of the pipes at the material inlet, and each, except the first one, by its upper end to the material outlet in the pipe above; each chute, except the last one, having an air-port at its delivery end and a hinged lip over the air-port; an adjustable air-damper in each material inlet in each pipe to control the admission of air through the inlet into the pipe; and an adjustable air-door in each of the pipes and located slightly above the level of the material inlet, to adjustably admit air to relieve the vacuum below the said air-door.

6. In a pneumatic separator and grader: two or more vertically disposed pipes arranged in series, each pipe having a material inlet on one side, a material outlet below the said inlet, and an air outlet above the said inlet; inclined material chutes connected each by its lower end to the material inlet of one of the pipes, and each, except the first one, by its upper end to the material outlet in the pipe above; each chute, except the last one, having an air-port at its delivery end and a hinged lip over the air-port; an air-door in each of the pipes located slightly above the level of the material inlet; a flexible bottom in each of the chutes; and adjusting means located outside each chute and connected with the bottom within the chute and by means of which the flexible bottom is given a flat or a curved surface.

7. In a pneumatic separator and grader, a vertically positioned pipe having a material inlet on one side, a material outlet below the said inlet, and an air outlet above the said inlet; exhaust means connected with the said air outlet; a material chute at the material inlet, the said chute having adjacent the pipe an adjustable lip, and under the lip an air-port; and in the material inlet an air-damper to control the admission of air into the pipe through the inlet; and an air-door in the side of the pipe and slightly above the level of the material inlet to relieve the vacuum below the said air-door.

8. In a pneumatic separator the combination of an air pipe connected with an exhaust system; a material chute connecting with and delivering into the air-pipe; the said chute having at its foot an air-port and also at its foot and controlling the air-port an adjustable lip forming a part of the bottom of the chute; an air-damper hinged in the chute and adjustable to control the air flowing over the surface of the said adjustable lip; an air-door in the air-pipe above the level of the chute connection for admitting free air to the air pipe to control the vacuum; a flexible bottom plate in the chute to control the spread of material in the chute; and means outside the chute and connected with the flexible bottom by which the height of the center portion of the bottom plate may be adjusted.

9. In a pneumatic separator the combination of an inclined material chute with a flexible bottom plate secured to the chute along its edges and free in its central regions; and means outside the chute and connected with the flexible bottom by which the height of the center portion of the bottom plate may be adjusted.

GEORGE W. HAMMACK.